(12) United States Patent
Ullrich et al.

(10) Patent No.: US 10,127,298 B2
(45) Date of Patent: Nov. 13, 2018

(54) FEEDBACK LOOPS FOR MANAGING PROFILE STORE SYNCHRONIZATION ISSUES

(71) Applicant: INTUIT INC., Mountain View, CA (US)

(72) Inventors: Tobias Ullrich, Muenster (DE); Lars Pfannenschmidt, Muenster (DE); Frank Wisniewski, Muenster (DE); Thorsten Krüger, Muenster (DE); Shabbir Y. Rajgara, Sunnyvale, CA (US); Guohan Gao, San Jose, CA (US)

(73) Assignee: INTUIT INC., Mountain View, CA (US)

( * ) Notice: Subject to any disclaimer, the term of this patent is extended or adjusted under 35 U.S.C. 154(b) by 310 days.

(21) Appl. No.: 14/928,913

(22) Filed: Oct. 30, 2015

(65) Prior Publication Data
US 2017/0124168 A1    May 4, 2017

(51) Int. Cl.
G06F 17/30    (2006.01)

(52) U.S. Cl.
CPC .. *G06F 17/30578* (2013.01); *G06F 17/30575* (2013.01)

(58) Field of Classification Search
None
See application file for complete search history.

(56) References Cited

U.S. PATENT DOCUMENTS

| | | | |
|---|---|---|---|
| 2003/0154187 A1* | 8/2003 | Hayakawa | G06F 17/30578 |
| 2006/0017552 A1* | 1/2006 | Andreasen | B60K 35/00 |
| | | | 340/438 |
| 2010/0274912 A1* | 10/2010 | Barnfield | H04L 67/20 |
| | | | 709/229 |
| 2013/0282811 A1 | 10/2013 | Lessin et al. | |
| 2013/0297564 A1 | 11/2013 | Brenton et al. | |
| 2014/0244488 A1 | 8/2014 | Kim et al. | |
| 2015/0305009 A1 | 10/2015 | Smith et al. | |

OTHER PUBLICATIONS

International Search Report and Written Opinion dated Jul. 27, 2016 for Application No. PCT/US2015/058460.

* cited by examiner

*Primary Examiner* — Bai D Vu
(74) *Attorney, Agent, or Firm* — Patterson + Sheridan, LLP

(57) ABSTRACT

The disclosed embodiments provide a system that manages synchronization between a profile store and a source of truth that is used to update the profile store via a real-time link. During operation, the system obtains a first set of attributes from a profile for an entity in the profile store. Next, the system obtains a second set of attributes for the entity from the source of truth. The system then compares the first and second sets of attributes to detect and correct mismatches between the first and second sets of attributes, wherein the corrected mismatches improve subsequent use of the profile in the profile store by the set of remote offerings. Finally, the system varies a rate of comparing the first and second sets of attributes for the mismatches based on one or more execution conditions associated with the source of truth.

20 Claims, 9 Drawing Sheets

FEEDBACK LOOPS FOR MANAGING PROFILE STORE SYNCHRONIZATION ISSUES

RELATED APPLICATIONS

The subject matter of this application is related to the subject matter in a co-pending non-provisional application by the same inventors as the instant application and filed on the same day as the instant application, entitled "Intelligent Verification of Updates to Profile Stores from Sources of Truth," having Ser. No. 14/928,966, and filing date Oct. 30, 2015.

The subject matter of this application is also related to the subject matter in a co-pending non-provisional application by the same inventors as the instant application and filed on the same day as the instant application, entitled "Managing Synchronization Issues Between Profile Stores and Sources of Truth," having Ser. No. 14/928,994, and filing date Oct. 30, 2015.

The subject matter of this application is also related to the subject matter in a co-pending non-provisional application by the same inventors as the instant application and filed on the same day as the instant application, entitled "Intelligent Batching of Verification Requests for Profile Stores," having Ser. No. 14/928,849, and filing date Oct. 30, 2015.

BACKGROUND

Related Art

The disclosed embodiments relate to techniques for storing and maintaining profile information. More specifically, the disclosed embodiments relate to feedback loops for managing synchronization issues between profile stores and sources of truth.

Websites and other online applications typically maintain profile information for their users, wherein this profile information can include various attributes, such as email addresses, telephone numbers, Social Security numbers and credit card numbers. This profile information is typically maintained in some type of "profile store," which contains profiles for various users (and possibly organizations), wherein each profile may contain dozens or even hundreds of fields containing individual pieces of profile information.

There exist a number of challenges in managing such a profile store. In particular, the profile store may act as the source of truth for some types of data and provide other types of data as read-only copies from their respective sources of truth. As a result, read-only copies of data in the profile store may be synchronized with their sources of truth on a periodic or near-real-time basis. Moreover, the accuracy of data in the profile store may require synchronization issues between the profile store and a source of truth to be detected and resolved.

Hence, what is needed is a method and an apparatus that facilitates making a copy of a profile store without the above-described problems.

SUMMARY

Profiles containing identifying information, attributes, or preferences of users, organizations, or other entities may be used by a number of offerings to provide services to the users. For example, personal profiles for people or organizational profiles for organizations may be used by a set of related offerings to perform tasks related to tax preparation, accounting, budgeting, payroll, or financial management.

To simplify access and updates to the profiles, profile data for the entities may be maintained in a unified profile store. The unified profile store may act as a shared, persistent store for data related to the entities. Attributes of profiles in the profile store may include identifying information, demographic information, preferences, behaviors, authentication information, or other data related to the identities, characteristics, or preferences of the entities. The offerings may interface with a profile service that manages the profile store to read and write to profiles in the profile store.

Because the profile store acts as a centralized location for entity attributes, updates to the profiles by one offering may be propagated seamlessly to the other offerings. Moreover, the profile store may allow the offerings to leverage cross-product data in personalizing user experiences or driving new product features, such as using results of a predictive model from one offering to make recommendations within another offering.

For some data, the profile store may act as the source of truth. In other cases, the profile data may maintain copies of attributes from external sources of truth of the attributes. For example, an identity service may be used to perform centralized identity management, authentication, and authorization workflows across the set of offerings. As a result, the identity service may be the source of truth for attributes related to the identities of the entities, and the profile store may maintain read-only copies of the attributes. Copies of the attributes in the profile store may further be updated in real-time from the identity service for fast and centralized querying of profile data that includes the attributes.

However, real-time synchronization of data between the profile store and a source of truth may be disrupted for a number of reasons. For example, synchronization issues between the profile store and source of truth may be caused by faulty configuration of a mechanism for synchronizing the profile store with the source of truth, network or data center outages, manual modification of data in the profile store, software bugs, or updates to the source of truth during bulk extraction of data from the source of truth to the profile store.

Such synchronization issues may be managed by a catch-up service that detects and corrects mismatches between attributes in the profile store and corresponding attributes in the source of truth. The catch-up service may use a first network connection with the profile store to obtain a first set of attributes from a profile for an entity in the profile store. The catch-up service may also use a second network connection with the source of truth to obtain a second set of attributes for the entity from the source of truth. The catch-up service may then use a mapping between the two sets of attributes to compare the two sets of attributes for mismatches. If a mismatch is found, the catch-up service may correct the mismatch by modifying the attributes in the profile store with one or more values from the second set of attributes. Thus, the catch-up service may help ensure that the profile store contains a complete and accurate copy of attributes from the source of truth, even when synchronization issues between the profile store and source of truth arise.

The catch-up service may also use a number of mechanisms to improve the efficiency and accuracy of managing the synchronization issues. First, the catch-up service may track one or more execution conditions associated with the profile store and/or source of truth and vary the rate of comparing attributes in the profile store with the source of truth for mismatches based on the execution conditions. For example, the catch-up service may adjust the rate of comparing the attributes for mismatches based on the load on the profile store or source of truth and a service-level agreement (SLA) for the profile store or source of truth. As a result, the catch-up service may operate in a way that does not interfere with access to the profile store or source of truth by other services or offerings.

Second, the catch-up service may select profiles in the profile store for verification of synchronization with the source of truth based on access patterns associated with the profile store. For example, the catch-up service may select profiles that have been recently updated, are frequently updated, and/or have not been accessed for a pre-specified period to verify the profiles' attributes with corresponding attributes in the source of truth.

Third, the catch-up service may reduce the load on the source of truth by batching sequences of requests to compare a profile in the profile store with the source of truth. To perform such batching, the catch-up service may delay processing of a request to compare attributes in the profile with the source of truth for a pre-specified period. During the pre-specified period, the catch-up service may ignore additional requests to compare the same attributes in the same profile with the source of truth. After the pre-specified period has passed, the catch-up service may compare the attributes in the profile with the source of truth to detect and correct mismatches between the profile and the source of truth.

Thus, the disclosed embodiments provide a system that manages synchronization between a profile store and a source of truth that is used to update the profile store via a real-time link. During operation, the system obtains a first set of attributes from a profile for an entity in the profile store. Next, the system obtains a second set of attributes for the entity from the source of truth. The system then compares the first and second sets of attributes to detect and correct mismatches between the first and second sets of attributes, wherein the corrected mismatches improve subsequent use of the profile in the profile store by the set of remote offerings. Finally, the system varies a rate of comparing the first and second sets of attributes for the mismatches based on one or more execution conditions associated with the source of truth.

In some embodiments, the system also tracks the one or more execution conditions.

In some embodiments, tracking the one or more execution conditions includes calculating a metric representing an execution condition, and tracking a change in the metric over time.

In some embodiments, the one or more execution conditions include an error rate associated with synchronizing the profile store with the source of truth.

In some embodiments, varying the rate of comparing the first and second sets of attributes for the mismatches based on the one or more execution conditions includes increasing the rate of comparing the first and second sets of attributes for the mismatches when an increase in the error rate is detected.

In some embodiments, the one or more execution conditions include a load on the source of truth.

In some embodiments, varying the rate of comparing the first and second sets of attributes for the mismatches based on the one or more execution conditions includes adjusting the rate of comparing the first and second sets of attributes for the mismatches based on the load and a service level agreement (SLA) for the source of truth.

In some embodiments, the one or more execution conditions include alternating changes to an attribute in the first set of attributes by the catch-up service and another service.

In some embodiments, varying the rate of comparing the first and second sets of attributes for the mismatches based on the one or more execution conditions includes discontinuing comparing of the attribute with a corresponding attribute in the second set of attributes, and generating an alert of the alternating changes to the attribute by the catch-up service and the other service.

In some embodiments, comparing the first and second sets of attributes to detect and correct mismatches between the first and second sets of attributes includes:
 (i) obtaining a mapping between the first set of attributes and the second set of attributes;
 (ii) using the mapping to compare the first and second sets of attributes for the mismatches; and
 (iii) when a mismatch between the first and second sets of attributes is found, correcting the mismatch by modifying the first set of attributes in the profile store with one or more values from the second set of attributes.

BRIEF DESCRIPTION OF THE FIGURES

In the figures, like reference numerals refer to the same figure elements.

DETAILED DESCRIPTION

Figure 1:
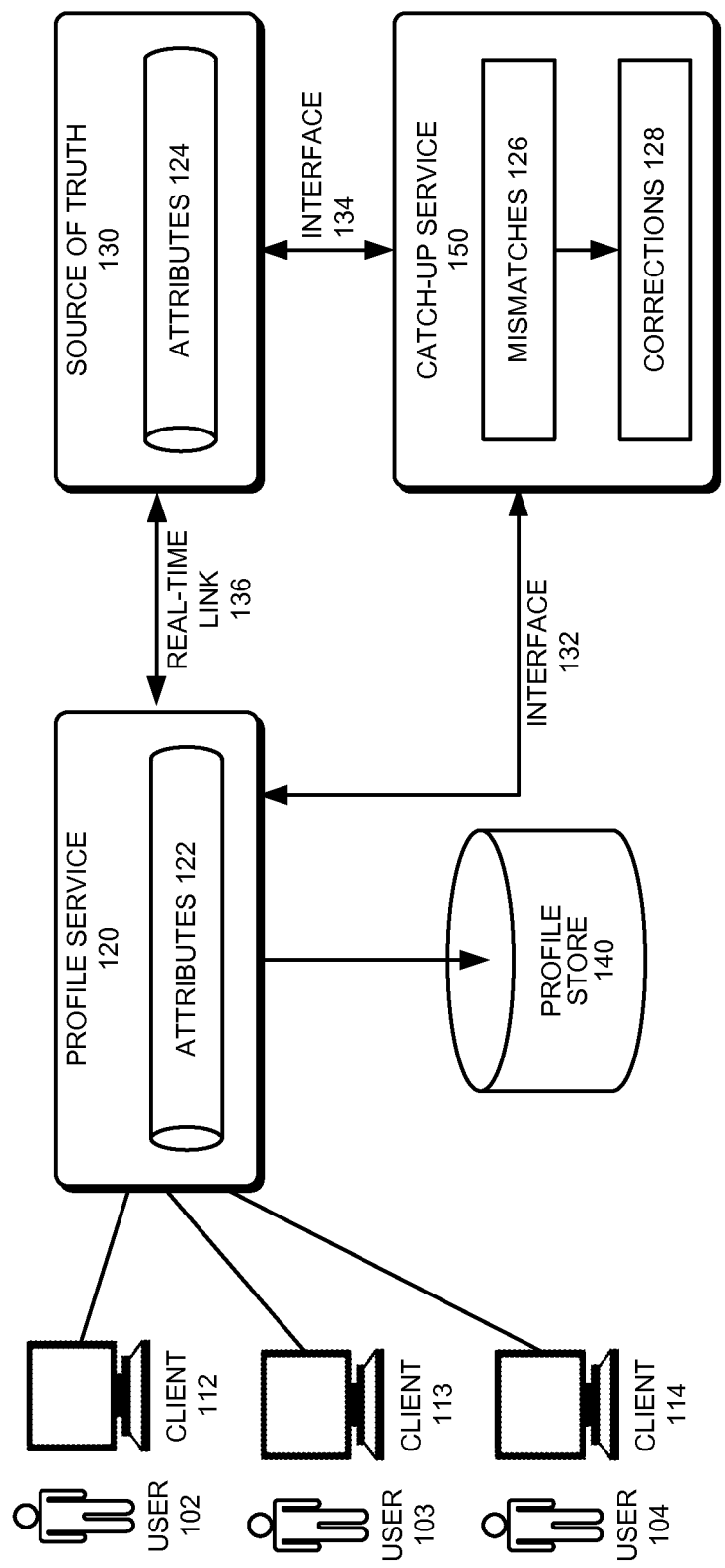
FIG. 1 shows a schematic of a system in accordance with the disclosed embodiments.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Profiles containing identifying information, attributes, or preferences of users, organizations, or other entities may be used by a number of offerings to provide services to the users. For example, personal profiles for people or organizational profiles for organizations may be used by a set of related offerings to perform tasks related to tax preparation, accounting, budgeting, payroll, or financial management.

To simplify access and updates to the profiles, profile data for the entities may be maintained in a unified profile store. The unified profile store may act as a shared, persistent store for data related to the entities. Attributes of profiles in the profile store may include identifying information, demographic information, preferences, behaviors, authentication information, or other data related to the identities, characteristics, or preferences of the entities. The offerings may interface with a profile service that manages the profile store to read and write to profiles in the profile store.

Because the profile store acts as a centralized location for entity attributes, updates to the profiles by one offering may be propagated seamlessly to the other offerings. Moreover, the profile store may allow the offerings to leverage cross-product data in personalizing user experiences or driving new product features, such as using results of a predictive model from one offering to make recommendations within another offering.

For some data, the profile store may act as the source of truth. In other cases, the profile data may maintain copies of attributes from external sources of truth of the attributes. For example, an identity service may be used to perform centralized identity management, authentication, and authorization workflows across the set of offerings. As a result, the identity service may be the source of truth for attributes related to the identities of the entities, and the profile store may maintain read-only copies of the attributes. Copies of the attributes in the profile store may further be updated in real-time from the identity service for fast and centralized querying of profile data that includes the attributes.

However, real-time synchronization of data between the profile store and a source of truth may be disrupted for a number of reasons. For example, synchronization issues between the profile store and source of truth may be caused by faulty configuration of a mechanism for synchronizing the profile store with the source of truth, network or data center outages, manual modification of data in the profile store, software bugs, or updates to the source of truth during bulk extraction of data from the source of truth to the profile store.

Such synchronization issues may be managed by a catch-up service that detects and corrects mismatches between attributes in the profile store and corresponding attributes in the source of truth. The catch-up service may use a first network connection with the profile store to obtain a first set of attributes from a profile for an entity in the profile store. The catch-up service may also use a second network connection with the source of truth to obtain a second set of attributes for the entity from the source of truth. The catch-up service may then use a mapping between the two sets of attributes to compare the two sets of attributes for mismatches. If a mismatch is found, the catch-up service may correct the mismatch by modifying the attributes in the profile store with one or more values from the second set of attributes. Thus, the catch-up service may help ensure that the profile store contains a complete and accurate copy of attributes from the source of truth, even when synchronization issues between the profile store and source of truth arise.

The catch-up service may also use a number of mechanisms to improve the efficiency and accuracy of managing the synchronization issues. First, the catch-up service may track one or more execution conditions associated with the profile store and/or source of truth and vary the rate of comparing attributes in the profile store with the source of truth for mismatches based on the execution conditions. For example, the catch-up service may adjust the rate of comparing the attributes for mismatches based on the load on the profile store or source of truth and a service-level agreement (SLA) for the profile store or source of truth. As a result, the catch-up service may operate in a way that does not interfere with access to the profile store or source of truth by other services or offerings.

Second, the catch-up service may select profiles in the profile store for verification of synchronization with the source of truth based on access patterns associated with the profile store. For example, the catch-up service may select profiles that have been recently updated, are frequently updated, and/or have not been accessed for a pre-specified period to verify the profiles' attributes with corresponding attributes in the source of truth.

Third, the catch-up service may reduce the load on the source of truth by batching sequences of requests to compare a profile in the profile store with the source of truth. To perform such batching, the catch-up service may delay processing of a request to compare attributes in the profile with the source of truth for a pre-specified period. During the pre-specified period, the catch-up service may ignore additional requests to compare the same attributes in the same profile with the source of truth. After the pre-specified period has passed, the catch-up service may compare the attributes in the profile with the source of truth to detect and correct mismatches between the profile and the source of truth.

FIG. 1 shows a schematic of a system in accordance with the disclosed embodiments. The system of FIG. 1 may be used to manage synchronization issues between a profile store 140 and a source of truth 130. As shown in FIG. 1, a profile service 120 may be used to perform various operations on behalf of a number of clients 112-114, which operate under control of users 102-104. For example, profile service 120 can enable a user to access various fields within the user's profile information or to update the user's profile information.

Note that clients 112-114 can be machines that belong to end users, or alternatively can be machines that host applications that interact with end users. For example, a client can implement a social-networking website that uses profile service 120 to keep track of profiles for users of the social-networking website. In another example, a client can implement a retail website that sells products to consumers, and this retail website can use profile service 120 to keep track of profile information for customers of the retail website. In a third example, clients 112-114 may access software offerings that perform different sets of related tasks for the end users, such as software offerings for tax preparation, accounting, financial management, budgeting, and/or payroll. The software applications may include web applications, native applications, mobile applications, and/or other types of applications that operate using a client-server model.

Profile service 120 stores individual profiles in a centralized profile store 140, wherein each profile includes attributes related to a specific person, organization, and/or other entity. For example, a profile can be a personal profile for a person. The personal profile may include personally identifying information (PII), such as a name, a date of birth, a phone number, an email address, and/or a postal address for the person. The personal profile may also include records and/or publicly accessible attributes for the person, such as the person's credit score, medical records, social media posts, residence history, employment history, and/or criminal record. The personal profile may further include the person's preferences, such as language preferences, communication preferences, notification preferences, and/or payment preferences. Finally, the personal profile may include psychographic factors, such as the activities, interests, opinions, attitudes, values, and/or behavior for the person.

Alternatively, the profile can be an organizational profile that stores information for a specific organization. For example, if the organization is a company, the profile can store the legal name, employer identification number (EIN), state of incorporation, address, and/or point of contact for the company and identify the officers of the company. The profile may also include the number of employees, revenue, products sold, function, physical location, and/or other characteristics of the company.

Profiles can also be stored for other types of entities that are not people or organizations. For example, profiles can also be stored for entities such as vehicles, buildings or cities.

Note that the fields in a profile can be stored in many possible formats. For example, the fields can be stored in an expandable format composed of a set of key-value pairs. Each key-value pair may represent an attribute that is an atomic unit of information in the profile. The key may be an attribute name that is a namespaced, fully qualified name of a field in the profile. A namespace may be a collection of attributes that are affiliated with an entity and/or grouped together by different aspects. Namespaces may further include sub-namespaces to create a hierarchy of namespaces. The value may be an attribute value that is a single scalar or a vector of scalars of the same type, which represent multiple values of the attribute. As an alternative or addition to storing the fields in an expandable format, fields in the profile may be stored in a predefined field structure within a conventional database record, or in fields defined in a row of a relational database table.

Profiles in profile store 140 may additionally be connected by a series of edges that denote directional relationships between pairs of entities. Each edge may have a label that defines the type of relationship, such as "customer of," "vendor of," "friends with," and/or "employee of." The edges may also be used to describe transactional relationships, such as "invoiced" or "reviewed." Each edge may include properties, which are key-value pairs that store atomic units of information associated with the edge. The key of a property may represent a name of a field in the edge that is implicitly qualified by the associated edge label. The value of a property may be a scalar or a vector of scalars of the same type, which represent multiple values of the property.

Consequently, profiles in profile store 140 may be used to construct a graph, with entities forming nodes in the graph and relationships of the entities forming edges in the graph. Profile service 120 may provide capabilities for segmenting across profiles based on attributes of the profiles and properties of the edges in the profiles. For example, profile service 120 may allow clients 112-114 to retrieve profiles with specific attributes or ranges of attributes (e.g., uses a mobile phone, lives in California, has a phone number with area code "415," etc.), edges, edge properties, and/or ranges of edge properties (e.g., is a customer of 10 companies, is employed by a company with more than $1 million of annual revenue, has an accountant, etc.).

During operation, clients 112-114 may make requests to profile service 120, which in turn performs various operations that involve storing and retrieving information from profile store 140. For example, clients 112-114 may interact with profile service 120 to search for profiles by attributes and/or properties, read profiles from profile store 140, write to profiles in profile store 140, and/or perform other operations related to profiles in profile store 140. Profile service 120 may process the requests and return results associated with the requests in real-time to clients 112-114.

Because profile service 120 and profile store 140 provide a centralized location for storing entity attributes and relationships, updates to the profiles by one client may be propagated seamlessly to the other clients. Moreover, real-time querying of profiles in profile store 140 may allow offerings executing on clients 112-114 to leverage cross-product data in personalizing user experiences and/or drive new product features, such as using results of a predictive model from one offering to make recommendations within another offering.

Profile service 120 and profile store 140 may act as the source of truth for some data. For example, profile service 120 and profile store 140 may act as the system of record (SOR) for product-specific customer attributes written and updated directly by offerings on clients 112-114, user-entered data received through the offerings, and/or psychographic factors from offline machine learning models.

Conversely, profile service 120 may use profile store 140 to maintain read-only copies of attributes 122 from an external source of truth 130. For example, source of truth 130 may be an identity service that performs centralized identity management, authentication, and authorization workflows across a set of offerings executing on clients 112-114. As a result, the identity service may be the source of truth for attributes 124 related to the identities of the entities, and profile store 140 may maintain attributes 122 as read-only copies of attributes 124.

To ensure that attributes 122 in profile store 140 are an up-to-date representation of the corresponding attributes 124 from source of truth 130, attributes 122 may be updated using a real-time link 136 between profile service 120 and source of truth 130. For example, profile service 120 and source of truth 130 may use a messaging protocol to synchronize attributes 122 with attributes 124 in real-time.

On the other hand, attributes 122 may become out of sync with attributes 124 if messages and/or other communication across real-time link 136 are lost. Such loss of communication may be caused by issues such as faulty configuration of real-time link 136, network or data center outages, manual modification of data in profile store 140, improper authorization to access profile store 140, software bugs, and/or updates to source of truth 130 during bulk extraction of data from source of truth 130 to profile store 140.

To remedy synchronization issues between profile service 120 and source of truth 130, a catch-up service 150 may detect mismatches 126 between attributes 122 and attributes 124 and make corrections 128 to mismatches 126. As shown in FIG. 1, catch-up service 150 may use a first interface 132 with profile service 120 to obtain attributes 122 and a second interface 134 with source of truth 130 to obtain attributes 124. For example, catch-up service 150 may use separate network connections, database calls, representational state transfer (REST) application-programming interfaces (APIs), messaging protocols, and/or other communication mechanisms to retrieve attributes 122 and 124 from profile service 120 and source of truth 130, respectively.

Next, catch-up service 150 may compare attributes 122 with attributes 124 for mismatches 126. For example, catch-up service 150 may obtain a mapping between attributes 122 and attributes 124 and use the mapping to compare attributes 122 with attributes 124. When one or more mismatches 126 are found by the comparison, catch-up service 150 may perform corrections 128 by modifying attributes 122 with one or more values from attributes 124. For example, catch-up service 150 may generate write requests to profile service 120 that replace erroneous and/or out-of-date value(s) in attributes 122 with the corresponding correct value(s) from attributes 124.

Catch-up service 150 may additionally use a number of mechanisms to efficiently and/or effectively identify mismatches 126 and make corrections 128 to mismatches 126. First, catch-up service 150 may track one or more execution conditions associated with profile store 120 and/or source of truth 130 and vary the rate of comparing attributes 122 and attributes 124 for mismatches 126 based on the execution conditions. For example, catch-up service 150 may adjust the rate of comparing attributes 122 and 124 for mismatches 126 based on the load on profile service 120 and/or source of truth 130 and a service-level agreement (SLA) for profile service 120 and/or source of truth 130. As a result, catch-up service 150 may operate in a way that does not interfere with access to profile store 140 or source of truth 130 by other services or offerings, such as offerings executing on clients 112-114.

Second, catch-up service 150 may select profiles in profile store 140 for use in verifying synchronization with source of truth 130 based on access patterns associated with profile store 140. For example, catch-up service 150 may select profiles that have been recently updated, are frequently updated, and/or have not been accessed for a pre-specified period for verification of the profiles' attributes 122 with corresponding attributes 124 in source of truth 130.

Third, catch-up service 150 may reduce the load on source of truth 130 by batching sequences of requests to compare a profile in profile store 140 with source of truth 130. To perform such batching, catch-up service 150 may delay processing of a request to compare attributes 122 with attributes 124 for a pre-specified period. During the pre-specified period, catch-up service 150 may ignore additional requests to compare the same attributes 122 in the same profile with corresponding attributes 124 from source of truth 130. After the pre-specified period has passed, catch-up service 150 may compare attributes 122 and 124 to detect mismatches 126 and perform corrections 128. The operation of catch-up service 150 is described in further detail below with respect to FIG. 3.

Figure 2:
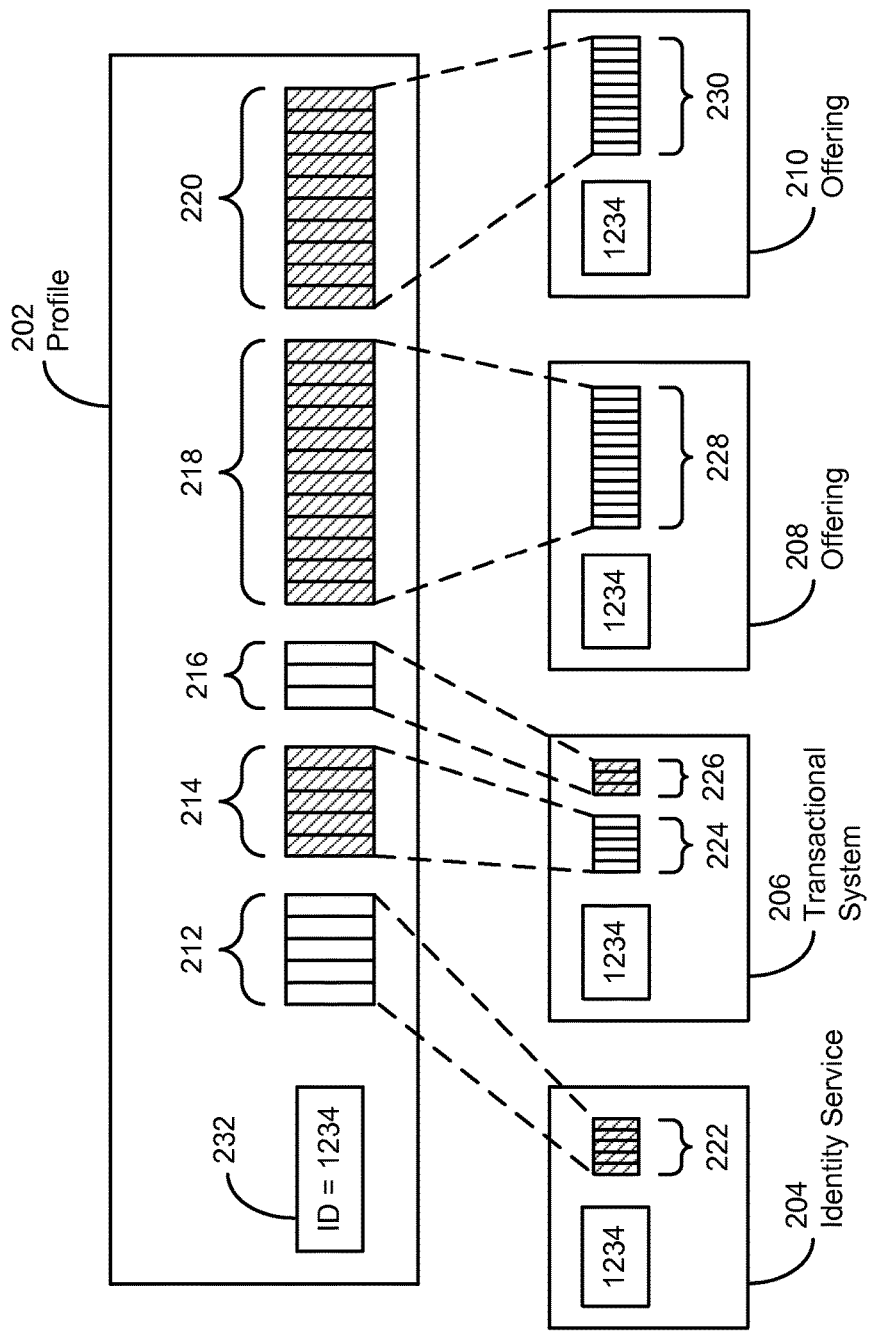
FIG. 2 shows the exemplary use of a profile store in accordance with the disclosed embodiments.

FIG. 2 shows the exemplary use of a profile 202 in accordance with the disclosed embodiments. Profile 202 may be maintained in a centralized profile store (e.g., profile store 140 of FIG. 1) by a profile service (e.g., profile service 120 of FIG. 1).

Profile 202 may include an identifier 232 of 1234 and a number of attributes 212-220. Identifier 232 may be a globally unique identifier for an entity represented by profile 202, such as a person or an organization. Attributes 212-220 may be atomic units of information in profile 202. Each attribute may have a name that uniquely identifies the attribute and a value that is mapped to the name.

For example, profile 202 may include the following exemplary JavaScript Object Notation (JSON) representation:

```
{
    "id":"1234",
    "values": {
        "core": { "name":"Sirius Cybernetics Corp.",
                  "entityType":"organization",
                  "oiiID":"73557534"
        },
        "firmographics": {
            "employees":27
        },
    }
}
```

The JSON representation above includes a value of 1234 for identifier 232 (e.g., "id"), followed by a set of attributes (e.g., attributes 212-220) denoted by "values." The attributes specify a namespace of "core" and a namespace of "firmographics." Within the "core" namespace, three attributes with names of "name," "entityType," and "oiiID" and values of "Sirius Cybernetics Corp.," "organization," and "73557534" are respectively listed. Within the "firmographics" namespace, one attribute with a name of "employees" and a value of 27 is listed. As a result, the JSON representation may describe a profile for an organization with 27 employees and a name of "Sirius Cybernetics Corp."

As discussed above, profile 202 may provide a single, unified view of profile data for a user, organization, and/or other entity. Attributes 212-220 may thus be stored in profile 202 for sharing among an identity service 204, a transactional system 206, and a number of offerings 208-210, which perform various tasks for the entity using attributes 212-220.

Moreover, profile 202 may be the source of truth for some data and maintain read-only copies of other data from external sources of truth. As shown in FIG. 2, attributes 212 may be copies of attributes 222 from an identity service 204, attributes 214 may be the SOR for a set of attributes 224 from a transactional system 206, and attributes 216 may be copies of attributes 226 from transactional system 206. Attributes 218 may be the SOR for a set of attributes 228 in one offering 208, and attributes 220 may be the SOR for a set of attributes 230 in another offering 210.

Offerings 208-210 may use the profile service to store attributes 218-220 for the entity in profile 202 and copy attributes 218-220 to attributes 228-230 during execution. For example, attributes 218-220 may be product-specific customer attributes that are directly written to and updated in profile 202 by offerings 208-210.

Transactional system 206 may interface with the profile service to maintain attributes 224 as copies of attributes 214 and copy the latest values of attributes 226 to attributes 216. For example, transactional system 206 may be used to process bills, subscriptions, and/or other financial transactions associated with offerings 208-210. As a result, transactional system 206 may be the SOR for records of the financial transactions, and profile 202 may be the SOR for summary usage data (e.g., number of logins, last login, features used during sessions, errors encountered, etc.) for products or services purchased through the financial transactions.

Identity service 204 may perform centralized identity management, authentication, and authorization workflows across offerings 208-210. As a result, identity service 204 may be the source of truth for attributes 222 related to the identity of the entity, and attributes 212 in profile 202 may be read-only copies of attributes 222. For example, attributes 222 may include PII for the entity, such as a full name, email address, phone number, tax identifier, and/or postal address. Attributes 222 may also include authentication credentials for the entity, such as a username, password, biometric fingerprint, digital certificate, security token, personal identification number (PIN), and/or pattern factor. Attributes 222 may further include identity-management attributes for the entity, such as an identity assurance level, identity namespace, identity type, identity validity (e.g., valid or invalid), role, permission, and/or ability to grant permissions. Finally, attributes 222 may include an identity identifier that is separate from identifier 232, such as an identifier represented by the "oiiID" name in the exemplary JSON representation above.

Attributes 212 may be updated in real-time from attributes 222 for fast and centralized querying of attributes 212 by transactional system 206 and/or offerings 208-210. Transactional system 206 and/or offerings 208-210 may access attributes 212 through the profile service to perform tasks such as personalizing user experiences. On the other hand, transactional system 206 and/or offerings 208-210 may interact with identity service 204 to perform a different set of tasks, such as authenticating users, recovering user accounts, and/or updating attributes 222.

Figure 3:
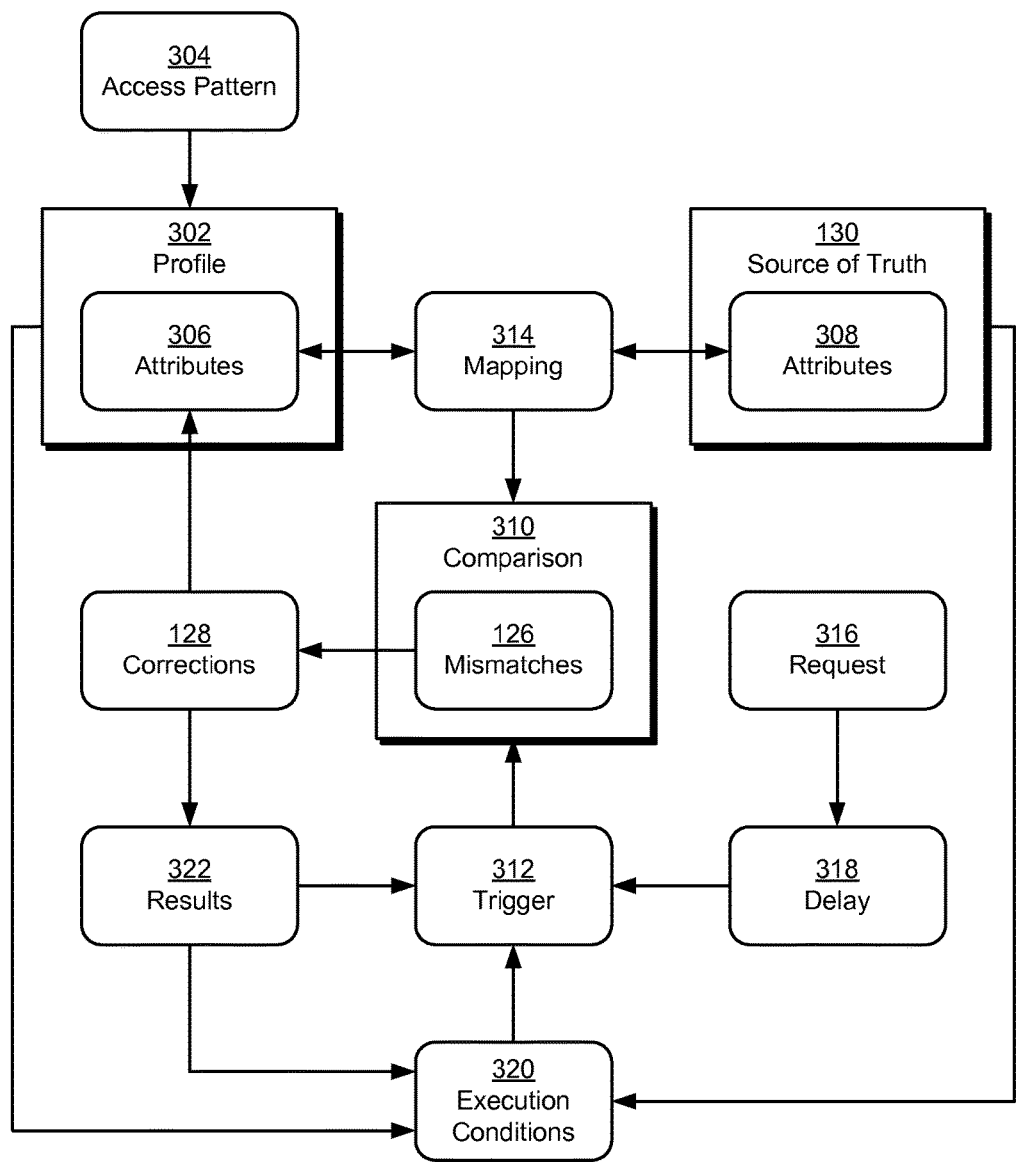
FIG. 3 shows the operation of a catch-up service in accordance with the disclosed embodiments.

FIG. 3 shows the operation of a catch-up service (e.g., catch-up service 150 of FIG. 1) in accordance with the disclosed embodiments. As mentioned above, the catch-up service may manage synchronization issues between a profile 302 in a profile store (e.g., profile store 140 of FIG. 1) and source of truth 130. For example, the catch-up service may include functionality to identify and correct a lack of synchronization between attributes 306 in profile 302 and attributes 308 maintained by an identity service that acts as source of truth 130 for attributes 306-308.

First, the catch-up service may use a mapping 314 to retrieve attributes 306-308. For example, the catch-up service may obtain a configuration file that maps an attribute name of "core.postaladdress" from profile 302 to a corresponding attribute name of "identity.mailingaddress" in source of truth 130. The catch-up service may use a first set of attribute names from the configuration file to query a profile service (e.g., profile service 120 of FIG. 1) over a first network connection for the corresponding attributes 306. Similarly, the catch-up service may use a second set of attribute names to which the first set of attribute names are mapped in the configuration file to query source of truth 130 over a second network connection for the corresponding attributes 308.

Next, the catch-up service may perform a comparison 310 of attributes 306-308. For example, the catch-up service may use mapping 314 to compare each attribute value in attributes 306 with the corresponding attribute value in attributes 308. If the two attribute values differ, the catch-up service may identify a mismatch in the pair of attributes. Thus, the result of comparison 310 may include one or more mismatches 126 between attributes 306 and attributes 308.

To resolve mismatches 126, the catch-up service may make one or more corrections 128 to attributes 306. In particular, the catch-up service may modify values in attributes 306 represented by mismatches 126 with the corresponding values from attributes 308. For example, the catch-up service may replace the value of a "core.postaladdress" attribute in profile 302 with the value of an "identity.mailingaddress" attribute from source of truth 130. The catch-up service may then log one or more results 322 of comparing attributes 306-308 for mismatches 126. For example, the catch-up service may update results 322 with timestamps associated with comparison 310 and corrections 128, as well as one or more attributes 306 affected by corrections 128. In turn, the logged results 322 may allow the catch-up service to track synchronization issues between profile 302 and source of truth 130, identify trends in synchronizing between profile 302 and source of truth 130, and/or perform other analysis of the synchronization issues.

The operation of the catch-up service may be affected and/or optimized by a number of other factors, including a trigger 312 that causes the catch-up service to perform comparison 310. Trigger 312 may be generated and/or received by the catch-up service. As shown in FIG. 3, trigger 312 may be generated 312 in response to one or more execution conditions 320 associated with profile 302 and/or source of truth 130. Execution conditions 320 may include one or more metrics associated with the performance of the profile service used to access profile 302 and/or source of truth 130. For example, execution conditions 320 may include the load on the profile service and/or source of truth 130, an error rate associated with synchronizing profile 302 with source of truth 130, and/or other parameters associated with maintaining profile 302, maintaining source of truth 130, and/or synchronizing profile 302 with source of truth 130.

Metrics representing execution conditions 320 may be tracked by the catch-up service and used to trigger 312 comparison 310 when certain criteria are met. First, the catch-up service may estimate the error rate of synchronizing profile 302 with source of truth 130 from results 322 and track changes in the error rate over time. When the error rate increases and/or exceeds a threshold, the catch-up service may increase the rate of comparing attributes 306 in profile 302 and/or other profiles in the profile store with corresponding attributes 308 in source of truth 130.

Second, the catch-up service may obtain the load on the profile service or source of truth 130 and an SLA for the profile service or source of truth 130 and adjust the rate of comparing attributes 306-308 based on the load and SLA. For example, the catch-up service may tune the rate of comparison 310 so that querying of the profile service and/or source of truth 130 by the catch-up service and other services or offerings does not exceed the number of calls per second that can be handled by the profile service and/or source of truth 130. In other words, the catch-up service may perform comparison 310 in a way that does not negatively impact the operation of the profile service or source of truth 130.

Third, execution conditions 320 may include alternating changes to one or more attributes 306 by the catch-up service and another service. For example, the catch-up service may replace a first value of an attribute in source of truth 130 with a second value of an attribute in profile 302 to correct a mismatch between the two attributes. The other service may detect the action of the catch-up service as an error and revert the attribute to the first value. As a result, the catch-up service and the other service may run in a loop that continuously alternates the value of the attribute without resolution. When the catch-up service detects such an execution condition, the catch-up service may discontinue comparison 310 and/or correction of the attribute. The catch-up service may also generate an alert of the execution condition to facilitate resolution of the execution condition by the other service and/or a developer or administrator associated with the other service.

Fourth, execution conditions 320 may include a bulk extraction of data from source of truth 130 to profile 302. For example, profile 302 and other profiles in the profile store may initially be populated in a batch process that copies a large number of attributes 308 from source of truth 130 to the profile store. During the batch process, updates to attributes 308 in source of truth 130 may fail to be propagated to attributes 306 by the batch process. Instead, the catch-up service may detect changes to attributes 308 during running of the batch process and generate trigger 312 so that the changes can be propagated by the catch-up service to attributes 306.

Finally, execution conditions 320 may include a notification of a potential mismatch between attributes 306 and attributes 308. The notification may be received from an external source. For example, a user represented by profile 302 may notice inaccuracies in attributes 306 during access to profile 302 from an offering. The user may generate the notification by manually flagging the inaccuracies through a user-interface element in the offering, or the user may interact with a customer service mechanism to generate the notification. In turn, the notification may trigger 312 comparison 310 of attributes 306 with attributes 308 and subsequent corrections 128 to the inaccuracies by the catch-up service.

Trigger 312 may also be generated in response to a request 316 to compare attributes 306 with attributes 308. Request 316 may be generated by the profile service, source of truth 130, and/or another external source in response to an update to attributes 308 in source of truth 130, changes in execution conditions 320, and/or other factors. In addition, execution conditions 320 may cause request 316 to be duplicated multiple times in a short interval. For example, request 316 may be transmitted whenever a user updates a field for an attribute in source of truth 130. Thus, as the user fills in a form containing multiple fields for attributes 308, a separate request 316 may be transmitted each time a form field is filled in by the user.

To reduce the load on source of truth 130 and/or other overhead associated with processing duplicate requests to compare profile 302 with source of truth 130 over a short period, the catch-up service may enforce a delay 318 when a first request 316 to compare attributes 306 with attributes 308 is received. During delay 318, the catch-up service may ignore additional requests to compare the same attributes 306 with source of truth 130. After delay 318 has passed, the catch-up service may trigger 312 comparison 310 and any subsequent corrections 128.

The catch-up service may additionally select delay 318 based on an attribute associated with request 316. The attribute may include a source of request 316, a frequency of access to attributes 308 by the catch-up service, and/or a pattern of requests to compare profile 302 with source of truth 130. For example, the catch-up service may identify profile 302 and/or attributes 306 from request 316 and use logged results 322 from previous comparisons of profile 302 with source of truth 130 to determine the frequency of access to attributes 308 by the catch-up service. The catch-up service may set delay 318 so that the frequency of access does not exceed a threshold.

In another example, the catch-up service may identify an offering that can be used to update source of truth 130 as a source of request 316. The catch-up service may use results 322 and/or another source of information to identify a pattern of requests from the offering to compare profile 302 with source of truth 130. The catch-up service may then set delay 318 so that a pre-specified average number of requests from the pattern are ignored before trigger 312 is generated.

Finally, the catch-up service may perform intelligent verification of synchronization of profile 302 with source of truth 130, independently of and/or in conjunction with request 316 and/or trigger 312. For example, the catch-up service may perform periodic and/or continuous sampling of profile 302 and/or other profiles in the profile store for comparison 310 with source of truth 130 to verify that the profile store is properly synchronized with source of truth 130. Such sampling may be performed in response to request 316 and/or trigger 312, or the sampling may be scheduled independently of request 316 and/or trigger 312, which may be used for other purposes.

During sampling of profiles in the profile store, the catch-up service may select profile 302 for comparison 310 based on an access pattern 304 associated with the profile store. Access pattern 304 may represent access to profile 302 by the catch-up service and/or other services. First, the catch-up service may use access pattern 304 to select profile 302 and/or other profiles in the profile store for use in verifying synchronization between the profile store and source of truth 130. For example, access pattern 304 may specify that the catch-up service sample profiles in the profile store so that an entirety of the profile store is accessed in chunks over a pre-specified period (e.g., a week).

Second, access pattern 304 may specify random selection of profile 302 and/or other profiles for use in verifying synchronization of the profile store with the source of truth. Such random selection may be increased during a light load on the profile store and/or source of truth 130 and decreased during a heavier load on the profile store and/or source of truth 130. In other words, the catch-up service may vary the rate of random selection of profiles in the profile store for use in verifying synchronization with source of truth 130 based on execution conditions 320 associated with the profile store and/or source of truth 130.

Third, access pattern 304 may include the frequencies and/or times of access or updates to profile 302. In turn, the catch-up service may select profiles in the profile store for use in verifying synchronization of the profile store with the source of truth so that profiles with recent updates or accesses, frequent updates or accesses, and/or a lack of updates or accesses are checked for synchronization with source of truth 130. By selecting profiles for comparison with source of truth 130 based on different types and/or characteristics of access patterns, the catch-up service may ensure that synchronization issues in the profile store that are associated with different usage patterns may be detected and remedied.

Fourth, access pattern 304 may include sequences of accesses that are associated with synchronization issues. For example, access pattern 304 may identify a pattern of five or more sequential updates to source of truth 130 that result in a lack of synchronization between the profile store and source of truth 130. As a result, the catch-up service may select all profiles associated with such sequences of updates for verification of synchronization with source of truth 130 after the sequences are performed to ensure that the profiles are properly synchronized with source of truth 130.

Figure 4:
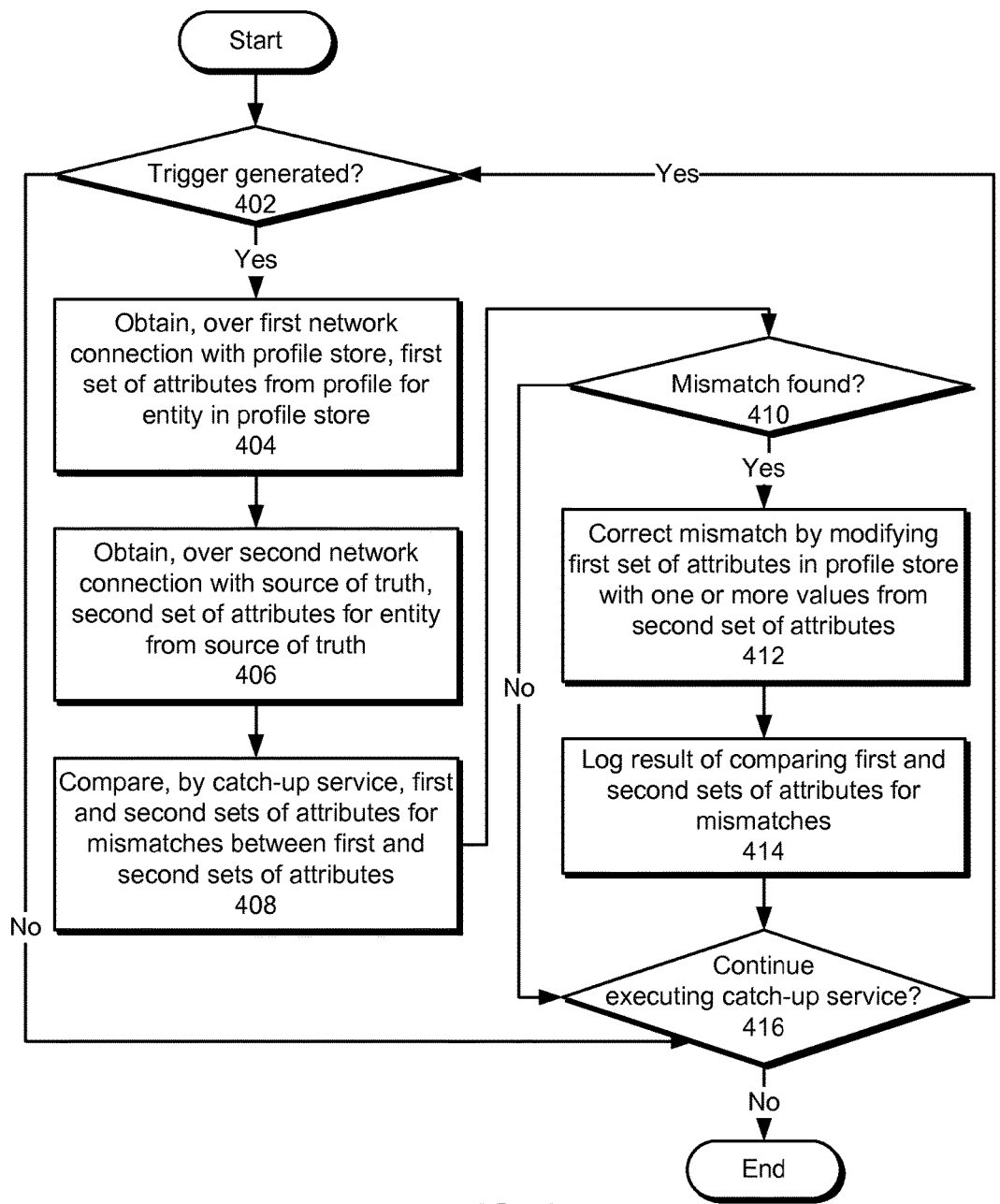
FIG. 4 shows a flowchart illustrating the process of managing synchronization between a profile store and a source of truth that is used to update the profile store via a real-time link in accordance with the disclosed embodiments.

FIG. 4 shows a flowchart illustrating the process of managing synchronization between a profile store and a source of truth that is used to update the profile store via a real-time link in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a trigger for comparing the profile store and the source of truth may be generated (operation 402). The trigger may be generated for a number of reasons. For example, the trigger may be generated after receiving a notification of a potential mismatch between the first and second sets of attributes. Alternatively, the trigger may be generated when a bulk extraction of data from the source of truth to the profile store is detected and a change in the second set of attributes is detected during the bulk extraction. The trigger may further be generated based on one or more execution conditions associated with the profile store and/or source of truth, as described in further detail below with respect to FIG. 5. Finally, the trigger may be generated after a delay in processing a request to compare the profile store and the source of truth has passed, as described in further detail below with respect to FIG. 6. If no trigger is generated, no processing of data from the profile store or source of truth is required.

If a trigger is generated, a first set of attributes from a profile for an entity in the profile store is obtained over a first network connection (operation 404), and a second set of attributes for the entity from the source of truth is obtained over a second network connection (operation 406). For example, different APIs, database calls, and/or messaging protocols may be used to retrieve data from the profile store and the source of truth.

Next, the first and second sets of attributes are compared by a catch-up service for mismatches between the first and second sets of attributes (operation 408). For example, the catch-up service may use a mapping between the first and second sets of attributes to retrieve the first and second sets of attributes from the profile store and source of truth and compare the first and second sets of attributes for mismatches.

A mismatch may be found (operation 410) by the catch-up service. If no mismatch is found between the first and second set of attributes, no corrections are made to the first or second set of attributes. If a mismatch is found, the mismatch is corrected by modifying the first set of attributes in the profile store with one or more values from the second set of attributes (operation 412). For example, the catch-up service may correct one or more mismatches by copying correct values from the second set of attributes to the first set of attributes. The catch-up service may then log a result of comparing the first and second sets of attributes for the mismatches (operation 414). The logged result may allow the catch-up service to track execution conditions associated with the profile store and/or source of truth and vary the rate of comparing the first and second attributes based on the execution conditions, as discussed in further detail below with respect to FIG. 5.

The catch-up service may continue to execute (operation 416) to detect and manage synchronization issues between the profile store and source of truth. During execution of the catch-up service, triggers to compare the first and second sets of attributes may be generated (operation 402). If a trigger is generated, the catch-up service may obtain the two sets of attributes from their respective sources (operations 404-406), compare the two sets of attributes for mismatches (operations 408-410), correct any mismatches (operation 412), and log the result of the comparison (operation 414). Execution of the catch-up service may continue until the profile store is no longer synchronized with the source of truth.

Figure 5:
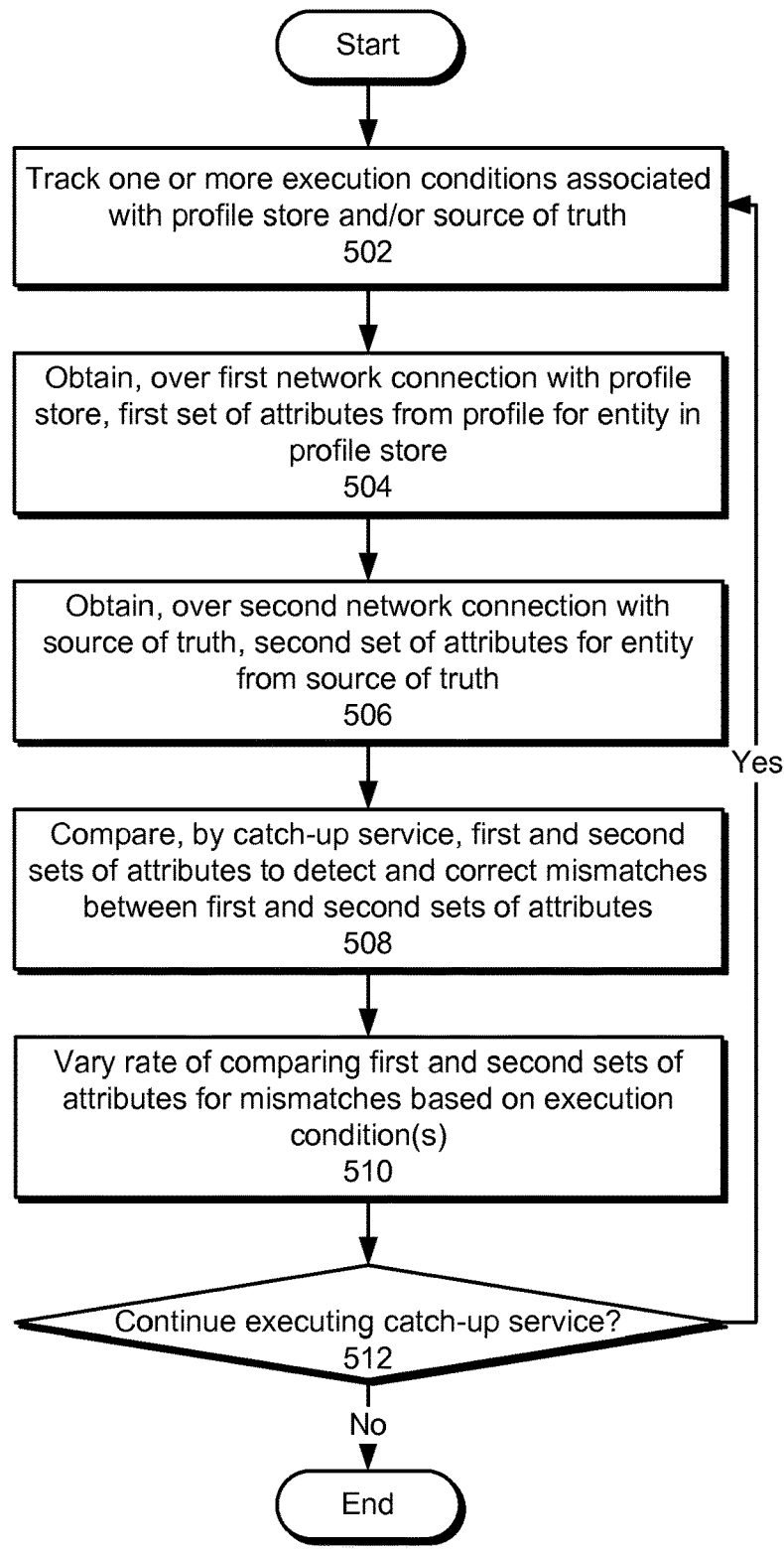
FIG. 5 shows a flowchart illustrating the process of managing synchronization between a profile store and a source of truth that is used to update the profile store via a real-time link in accordance with the disclosed embodiments.

FIG. 5 shows a flowchart illustrating the process of managing synchronization between a profile store and a source of truth that is used to update the profile store via a real-time link in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, one or more execution conditions associated with the profile store and/or source of truth are tracked (operation 502). The execution conditions may include an error rate associated with synchronizing the profile store with the source of truth, a load on the profile store and/or source of truth, and/or alternating changes to an attribute in the first set of attributes by the catch-up service and another service. Each execution condition may be tracked by calculating a metric representing the condition and tracking the change in the metric over time. For example, the values and/or change in values of the error rate may be calculated and tracked to determine trends and/or patterns in the error rate over time.

Next, a first set of attributes from a profile for an entity in the profile store is obtained over a first network connection (operation 504), and a second set of attributes for the entity from the source of truth is obtained over a second network connection (operation 506). The first and second sets of attributes are then compared by a catch-up service for mismatches between the first and second sets of attributes (operation 508).

The catch-up service also varies a rate of comparing the first and second sets of attributes for the mismatches based on the execution condition(s) (operation 510). Continuing with the previous example, when an increase in the error rate is detected, the catch-up service may increase the rate of comparing the first and second sets of attributes for the mismatches. In turn, the increased rate of comparing and correcting the mismatches by the catch-up service may reduce the error rate and prevent a rise in the error rate from causing further issues with using data in the profile store. In another example, the catch-up service may adjust the rate of comparing the first and second sets of attributes for the mismatches based on the load and an SLA for the profile store and/or source of truth so that comparison of the two sets of attributes does not overwhelm the profile store and/or source of truth. In a third example, when the catch-up service detects alternating changes to an attribute in the first set of attributes by the catch-up service and another service, the catch-up service may discontinue comparing of the attribute with a corresponding attribute in the second set of attributes and generating an alert of the alternating changes to the attribute by the catch-up service and the other service.

The catch-up service may continue executing (operation 512) to manage synchronization issues between the profile store and the source of truth based on the execution conditions. During operation of the catch-up service, the catch-up service may track the execution conditions (operation 502), obtain and compare the two sets of attributes to detect and correct mismatches between the two sets of attributes (operations 504-508), and vary the rate of comparing the sets of attributes for mismatches based on the execution conditions (operation 510). Execution of the catch-up service may continue until the profile store is no longer synchronized with the source of truth.

Figure 6:
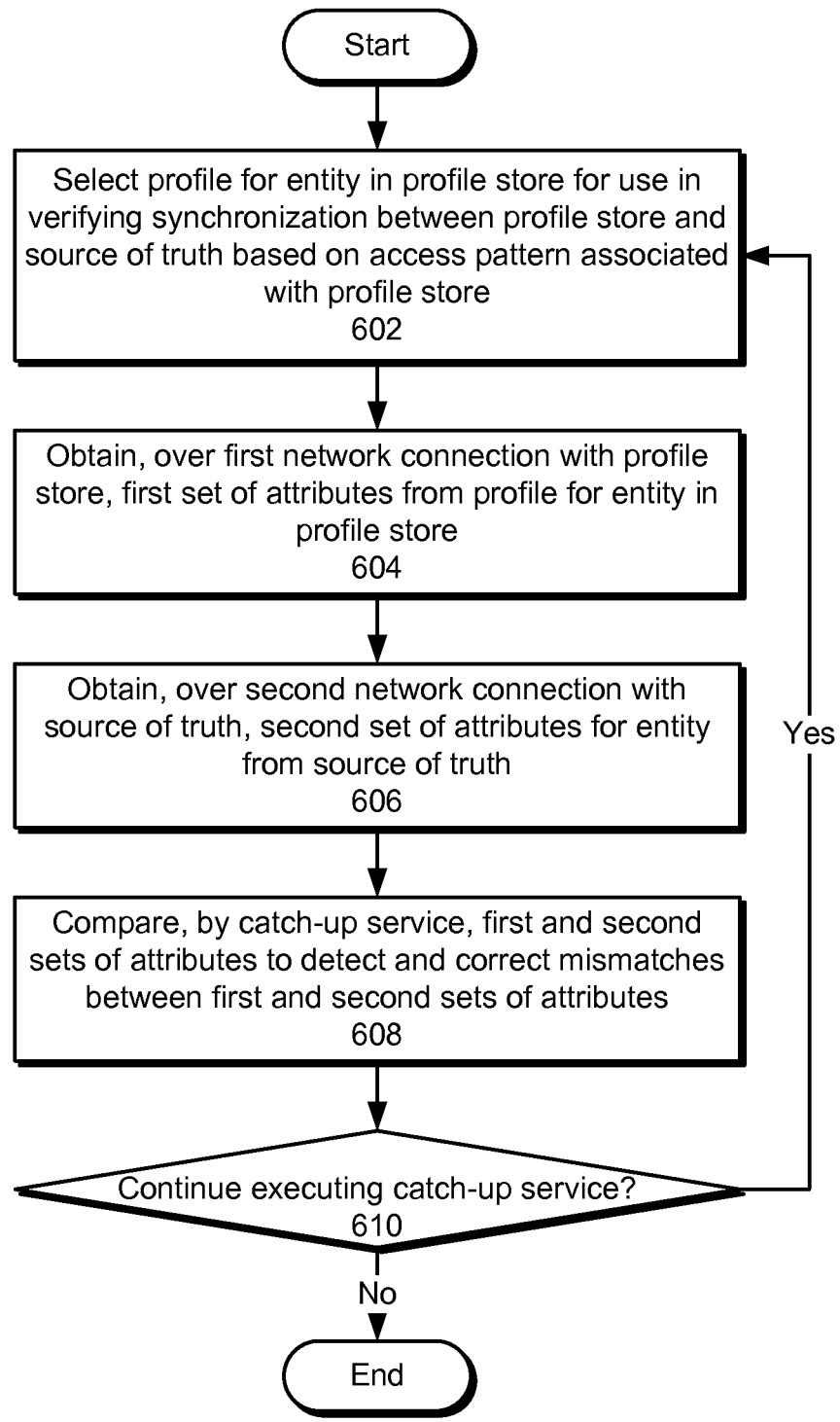
FIG. 6 shows a flowchart illustrating the process of managing synchronization between a profile store and a source of truth that is used to update the profile store via a real-time link in accordance with the disclosed embodiments.

FIG. 6 shows a flowchart illustrating the process of managing synchronization between a profile store and a source of truth that is used to update the profile store via a real-time link in accordance with the disclosed embodiments. In one or more embodiments, one or more of the steps may be omitted, repeated, and/or performed in a different order. Accordingly, the specific arrangement of steps shown in FIG. 6 should not be construed as limiting the scope of the embodiments.

First, a profile for an entity in a profile store is selected for use in verifying the synchronization between the profile store and the source of truth based on an access pattern associated with the profile store (operation 602). For example, the profile may be sampled with other profiles in the profile store during a process that compares some or all of the profiles in the profile store with the source of truth.

More specifically, the access pattern may be used to select the profile and other profiles in the profile store. In one example, the profile may be randomly selected according to a random access pattern for the profile store. In addition, random selection of the profile and other profiles in the profile store for use in verifying synchronization between the profile store and the source of truth may be increased during a light load on the profile store and/or source of truth. In another example, the access pattern may specify accessing the entirety of the profile store over a pre-specified period.

The access pattern may alternatively or additionally represent patterns of previous access or updates to the profile and/or other profiles in the profile store. For example, the access pattern may identify the frequencies and/or times of access or updates to the profiles by a set of offerings. In turn, the profile may be selected when the frequency of access to the profile exceeds a threshold, upon detecting a recent update to the profile, when the profile has not been accessed for a pre-specified period, and/or when a synchronization issue is identified in a series of accesses in the access pattern and the profile is included in the series of accesses.

Next, a first set of attributes from a profile for an entity in the profile store is obtained over a first network connection (operation 604), and a second set of attributes for the entity from the source of truth is obtained over a second network connection (operation 606). The first and second sets of attributes are then compared by a catch-up service for mismatches between the first and second sets of attributes (operation 608).

The catch-up service may continue executing (operation 610) during sampling and/or verification of profiles in the profile store. During execution of the catch-up service, one or more profiles are selected for use in the verification (operation 602), and attributes in the profiles are obtained and compared with attributes in the source of truth to detect and correct mismatches between the profiles and source of truth (operations 604-608). Such execution of the catch-up service may continue until the verification is complete and/or discontinued.

Figure 7:
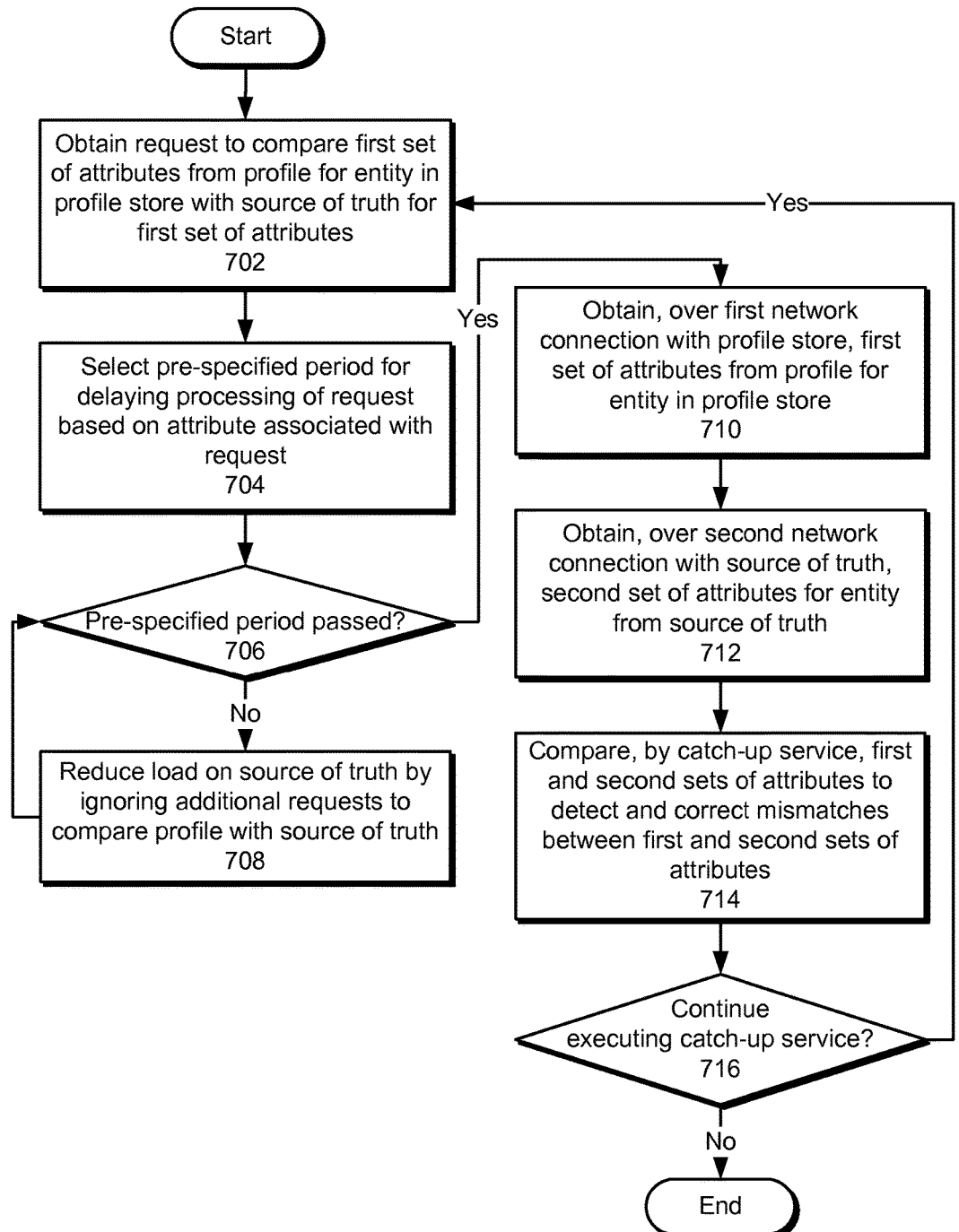
FIG. 7 shows a flowchart illustrating the process of managing synchronization between a profile store and a source of truth that is used to update the profile store via a real-time link in accordance with the disclosed embodiments.

FIG. 7 shows a flowchart illustrating the process of managing synchronization between a profile store and a source of truth that is used to update the profile store via a real-time link in accordance with the disclosed embodiments. In one or more embodiments, one or more of the steps may be omitted, repeated, and/or performed in a different order. Accordingly, the specific arrangement of steps shown in FIG. 7 should not be construed as limiting the scope of the embodiments.

First, a request to compare a first set of attributes from a profile for an entity in the profile store with a source of truth for the first set of attributes is obtained (operation 702). For example, the request may be received after a second set of attributes for the entity in the source of truth has been updated. Next, a pre-specified period for delaying processing of the request is selected based on an attribute associated with the request (operation 704). For example, the pre-specified period may be selected based on attributes and/or patterns associated with the source of the request, the frequency of access to a second set of attributes for the entity in the source of truth by the catch-up service, and/or a pattern of requests to compare the profile with the source of truth.

Processing of the request may be delayed until the pre-specified period has passed (operation 706). If the pre-specified period has not passed, no further processing of the request is performed, and the load on the source of truth is reduced by ignoring additional requests to compare the profile with the source of truth (operation 708).

After the pre-specified period has passed, processing of the request may proceed. In particular, a first set of attributes from a profile for an entity in the profile store is obtained over a first network connection (operation 710), and a second set of attributes for the entity from the source of truth is obtained over a second network connection (operation 712). The first and second sets of attributes are then compared by a catch-up service for mismatches between the first and second sets of attributes (operation 714), as described in further detail below with respect to FIG. 8.

Execution of the catch-up service may continue (operation 716) during processing of requests to compare the profile store with the source of truth. During execution of the catch-up service, requests to compare the profile and/or other profiles in the profile store with the source of truth are obtained (operation 702), and processing of the request is delayed for a pre-specified period (operations 704-706). Duplicate requests to compare the same profiles with the source of truth are also ignored (operation 708) during the pre-specified period of delay. Once the pre-specified period has passed, attributes in the profiles are obtained and compared with attributes in the source of truth to detect and correct mismatches between the profiles and source of truth (operations 710-714). Such execution of the catch-up service may continue until delayed processing of requests by the catch-up service is no longer performed.

Figure 8:
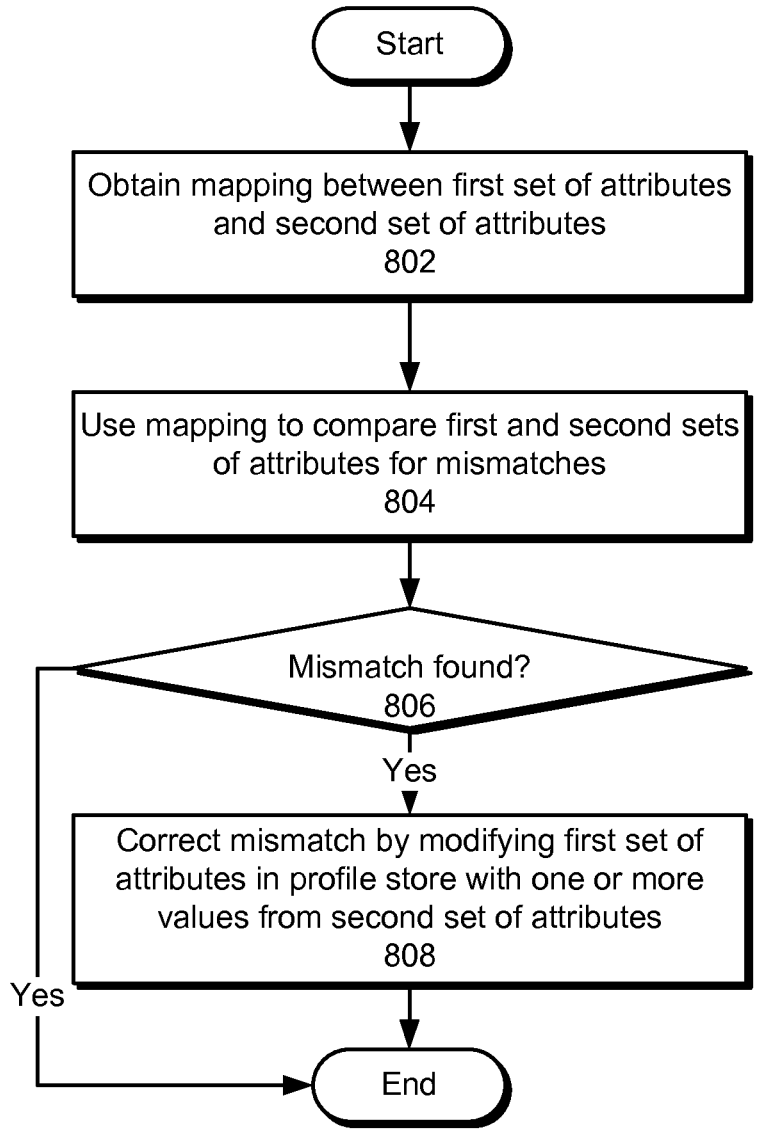
FIG. 8 shows a flowchart illustrating the process of comparing a first set of attributes from a profile for an entity in a profile store with a second set of attributes for the entity from a source of truth to detect and correct mismatches between the two sets of attributes in accordance with the disclosed embodiments.

FIG. 8 shows a flowchart illustrating the process of comparing a first set of attributes from a profile for an entity in a profile store with a second set of attributes for the entity from a source of truth to detect and correct mismatches between the two sets of attributes in accordance with the disclosed embodiments. In one or more embodiments, one or more of the steps may be omitted, repeated, and/or performed in a different order. Accordingly, the specific arrangement of steps shown in FIG. 8 should not be construed as limiting the scope of the embodiments.

First, a mapping between the first set of attributes and the second set of attributes is obtained (operation 802). For example, a configuration file that maps unique identifiers for the first set of attributes to unique identifiers for the second set of attributes may be obtained. Next, the mapping is used to compare the first and second sets of attributes for mismatches (operation 804). For example, the mapping may be used to compare individual attributes in the first set of attributes to individual attributes in the second attributes.

A mismatch between the first and second sets of attributes may be found (operation 806). If no mismatch is found between the first and second sets of attributes, no corrections are made to the first or second set of attributes. If a mismatch is found, the mismatch is corrected by modifying the first set of attributes in the profile store with one or more values from the second set of attributes (operation 808). For example, a mismatch between a user's last name in the source of truth and a copy of the user's last name in the profile store may be resolved by replacing the user's last name in the profile store with the user's last name from the source of truth.

Figure 9:
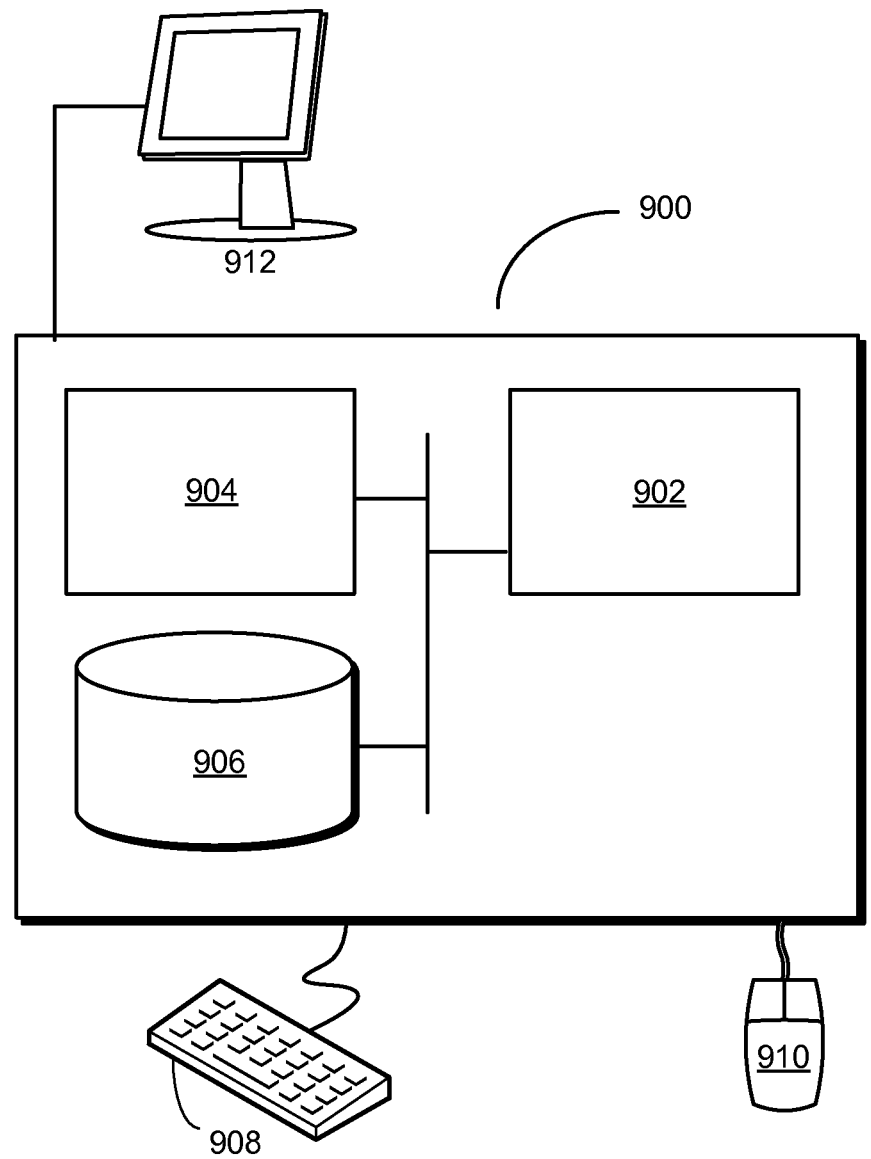
FIG. 9 shows a computer system in accordance with the disclosed embodiments.

FIG. 9 shows a computer system 900 in accordance with an embodiment. Computer system 900 may correspond to an apparatus that includes a processor 902, memory 904, storage 906, and/or other components found in electronic computing devices. Processor 902 may support parallel processing and/or multi-threaded operation with other processors in computer system 900. Computer system 900 may also include input/output (I/O) devices such as a keyboard 908, a mouse 910, and a display 912.

Computer system 900 may include functionality to execute various components of the present embodiments. In particular, computer system 900 may include an operating system (not shown) that coordinates the use of hardware and software resources on computer system 900, as well as one or more applications that perform specialized tasks for the user. To perform tasks for the user, applications may obtain the use of hardware resources on computer system 900 from the operating system, as well as interact with the user through a hardware and/or software framework provided by the operating system.

In one or more embodiments, computer system 900 provides a system for managing synchronization between a profile store and a source of truth that is used to update the profile store via a real-time link. The system may include a catch-up service that obtains, over a first network connection with the profile store, a first set of attributes from a profile for an entity in the profile store, wherein the profile in the profile store is shared and updated by a set of remote offerings that use the profile to perform one or more tasks for the entity. The catch-up service may also obtain, over a second network connection with the source of truth, a second set of attributes for the entity from the source of truth, wherein the second set of attributes from the source of truth is used by the set of remote offerings to perform one or more additional tasks for the entity. The catch-up service may then compare the first and second sets of attributes for mismatches between the first and second sets of attributes. When a mismatch between the first and second sets of attributes is found, the catch-up service may correct the mismatch by modifying the first set of attributes in the profile store with one or more values from the second set of attributes to improve subsequent use of the profile in the profile store by the set of remote offerings.

The catch-up service may perform a number of additional operations related to managing the synchronization issues. First, to reduce a load on the source of truth, the catch-up service may delay processing of a request to compare the first and second sets of attributes for a pre-specified period and ignore additional requests to compare the profile with the source of truth during the pre-specified period. Second, the catch-up service may vary a rate of comparing the first and second sets of attributes for the mismatches based on one or more execution conditions associated with the source of truth. Third, the catch-up service may select a profile in the profile store for use in verifying synchronization between the profile store and the source of truth based on an access pattern associated with the profile store.

In addition, one or more components of computer system 900 may be remotely located and connected to the other components over a network. Portions of the present embodiments (e.g., profile service, profile store, source of truth, identity service, catch-up service, etc.) may also be located on different nodes of a distributed system that implements the embodiments. For example, the present embodiments may be implemented using a cloud computing system that manages the synchronization of profile data in a centralized profile store with a set of remote offerings and/or sources of truth.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A method for managing synchronization between a profile store and a source of truth, comprising:
    obtaining, by a catch-up service executing on a processor, a first set of attributes from a profile in the profile store over a first network connection with the profile store;
    performing, by the catch-up service, a comparison between the first set of attributes and a second set of attributes in the source of truth by, for each attribute in the first set of attributes:
        querying the source of truth for a corresponding attribute in the second set of attributes; and
        comparing the attribute in the first set of attributes and the corresponding attribute;
    determining a load on the source of truth; and
    upon determining that the load on the source of truth exceeds a threshold, preventing the catch-up service from exceeding a number of calls per second that can be handled by the source of truth by varying a rate of the comparison;
    detecting, by the catch-up service and based on the comparison, one or more mismatches between the first set of attributes and the second set of attributes; and
    correcting, by the catch-up service, the one or more mismatches by modifying one or more attributes in the first set of attributes in the profile store based on one or more corresponding attributes from the second set of attributes, wherein the correcting improves an accuracy of the first set of attributes in the profile store.

2. The method of claim 1, further comprising: tracking, by the catch-up service, one or more execution conditions associated with the source of truth.

3. The method of claim 1, wherein the comparison is initialized based on a trigger generated by the catch-up service.

4. The method of claim 2, wherein the one or more execution conditions comprise an error rate.

5. The method of claim 4, wherein varying the rate of the comparison is based on the load on the source of truth and the error rate.

6. The method of claim 1, wherein the attribute in the first set of attributes is compared to the corresponding attribute in the second set of attributes based on an access pattern associated with the profile.

7. The method of claim 6, wherein varying the rate of the comparison is based on the load on the source of truth and a service level agreement (SLA) for the source of truth.

8. The method of claim 2, wherein the one or more execution conditions comprise alternating changes to the attribute in the first set of attributes by the catch-up service and a different service.

9. The method of claim 8, wherein varying the rate of the comparison comprises:
   discontinuing the comparing of the attribute in the first set of attributes with the corresponding attribute in the second set of attributes; and
   generating an alert of the alternating changes to the attribute in the first set of attributes by the catch-up service and the different service.

10. The method of claim 1, wherein comparing the attribute in the first set of attributes and the corresponding attribute in the second set of attributes comprises:
    obtaining a mapping between each attribute in the first set of attributes and a corresponding attribute in the second set of attributes; and
    using the mapping to compare the first set of attributes and the second set of attributes.

11. An apparatus, comprising:
    one or more processors; and
    memory storing instructions that, when executed by the one or more processors, cause the apparatus to:
       obtain a first set of attributes from a profile in a profile store over a network connection with the profile store;
       perform, by a catch-up service, a comparison between the first set of attributes and a second set of attributes in a source of truth by, for each attribute in the first set of attributes:
          querying the source of truth for a corresponding attribute in the second set of attributes; and
          comparing the attribute in the first set of attributes and the corresponding attribute;
       determining a load on the source of truth; and
       upon determining that the load on the source of truth exceeds a threshold, preventing the catch-up service from exceeding a number of calls per second that can be handled by the source of truth by varying a rate of the comparison;
       detect, based on the comparison, one or more mismatches between the first set of attributes and the second sets of attributes; and
       correct the one or more mismatches by modifying one or more attributes in the first set of attributes in the profile store based on one or more corresponding attributes from the second set of attributes, wherein correcting the one or more mismatches improves an accuracy of the first set of attributes in the profile store.

12. The apparatus of claim 11, wherein the memory further stores instructions that, when executed by the one or more processors, cause the apparatus to: track one or more execution conditions associated with the source of truth.

13. The apparatus of claim 12, wherein the one or more execution conditions comprise an error rate.

14. The apparatus of claim 13, wherein the rate of the comparison is varied based on the load on the source of truth and the error rate.

15. The apparatus of claim 11, wherein the attribute in the first set of attributes is compared to the corresponding attribute in the second set of attributes based on an access pattern to associated with the profile.

16. The apparatus of claim 15, wherein the rate of the comparison is varied based on the load on the source of truth and a service level agreement (SLA) for the source of truth.

17. The apparatus of claim 12, wherein the one or more execution conditions comprise alternating changes to the attribute in the first set of attributes by the catch-up service and a different service.

18. The apparatus of claim 17, wherein the rate of the comparison is varied by:
    discontinuing the comparing of the attribute in the first set of attributes with the corresponding attribute in the second set of attributes; and
    generating an alert of the alternating changes to the attribute in the first set of attributes by the catch-up service and the different service.

19. A non-transitory computer-readable storage medium storing instructions that when executed by a computer cause the computer to perform a method for managing synchronization between a profile store and a source of truth, the method comprising:
    obtaining, by a catch-up service executing on a processor, a first set of attributes from a profile in the profile store over a network connection with the profile store;
    performing, by the catch-up service, a comparison between the first set of attributes and a second set of attributes in the source of truth by, for each attribute in the first set of attributes:
       querying the source of truth for a corresponding attribute in the second set of attributes; and
       comparing the attribute in the first set of attributes and the corresponding attribute;
    determining a load on the source of truth; and
    upon determining that the load on the source of truth exceeds a threshold, preventing the catch-up service from exceeding a number of calls per second that can be handled by the source of truth by varying a rate of the comparison;
    detecting, by the catch-up service and based on the comparison, one or more mismatches between the first set of attributes and the second sets of attributes; and
    correcting, by the catch-up service, the one or more mismatches by modifying one or more attributes in the first set of attributes in the profile store based on one or more corresponding attributes from the second set of attributes, wherein the correcting improves an accuracy of the first set of attributes in the profile store.

20. The non-transitory computer-readable storage medium of claim 19, wherein comparing the attribute in the first set of attributes and the corresponding attribute in the second set of attributes comprises:

obtaining a mapping between each attribute in the first set of attributes and a corresponding attribute in the second set of attributes; and using the mapping to compare the first set of attributes and the second set of attributes.

\* \* \* \* \*